(12) United States Patent
Duhig

(10) Patent No.: US 8,397,180 B2
(45) Date of Patent: Mar. 12, 2013

(54) SCROLLING BROWSER WITH PREVIEWING AREA

(75) Inventor: Jonathan Anthony Duhig, Scotland Island (AU)

(73) Assignee: Canon Kabushiki Kaisha, Tokyo (JP)

( * ) Notice: Subject to any disclaimer, the term of this patent is extended or adjusted under 35 U.S.C. 154(b) by 1245 days.

(21) Appl. No.: 11/952,688

(22) Filed: Dec. 7, 2007

(65) Prior Publication Data

US 2008/0155473 A1 Jun. 26, 2008

(30) Foreign Application Priority Data

Dec. 21, 2006 (AU) .............................. 2006252194

(51) Int. Cl.
*G06F 3/048* (2006.01)

(52) U.S. Cl. ........ 715/838; 715/836; 715/782; 715/810; 345/173

(58) Field of Classification Search .................. 715/781, 715/784–788, 800–802, 815, 821, 830, 244
See application file for complete search history.

(56) References Cited

U.S. PATENT DOCUMENTS

| | | | |
|---|---|---|---|
| 5,202,961 A | 4/1993 | Mills et al. ..................... | 395/159 |
| 5,434,591 A | 7/1995 | Goto et al. ..................... | 345/123 |
| 5,452,413 A | 9/1995 | Blades .......................... | 395/159 |
| 5,495,566 A | 2/1996 | Kwatinetz ..................... | 395/157 |
| 5,530,455 A | 6/1996 | Gillick et al. ................. | 345/163 |
| 5,623,588 A | 4/1997 | Gould ........................... | 395/326 |
| 5,760,767 A | 6/1998 | Shore et al. ................... | 345/328 |
| 5,774,109 A | 6/1998 | Winksy et al. ................ | 345/124 |
| 5,801,702 A | 9/1998 | Dolan et al. ................... | 345/357 |
| 5,936,618 A | 8/1999 | Spiero et al. .................. | 345/204 |
| 5,943,679 A * | 8/1999 | Niles et al. ..................... | 715/247 |
| 6,097,371 A | 8/2000 | Siddiqui et al. ............... | 345/164 |
| 6,121,966 A * | 9/2000 | Teodosio et al. .............. | 715/838 |
| 6,154,205 A | 11/2000 | Carroll et al. ................. | 345/327 |
| 6,252,597 B1 | 6/2001 | Lokuge ......................... | 715/841 |
| 6,262,724 B1 | 7/2001 | Crow et al. ..................... | 345/328 |
| 6,613,100 B2 * | 9/2003 | Miller ........................... | 715/273 |
| 6,725,427 B2 * | 4/2004 | Freeman et al. .............. | 715/273 |
| 6,738,045 B2 | 5/2004 | Hinckley et al. .............. | 345/163 |
| 6,747,680 B1 | 6/2004 | Igarashi et al. ................ | 715/784 |
| 6,909,443 B1 * | 6/2005 | Robertson et al. ............ | 715/782 |
| 6,971,121 B2 | 11/2005 | West et al. ..................... | 725/142 |
| 6,976,229 B1 | 12/2005 | Balabanovic et al. ......... | 715/838 |
| 7,051,291 B2 * | 5/2006 | Sciammarella et al. ....... | 715/838 |

(Continued)

FOREIGN PATENT DOCUMENTS

| | | |
|---|---|---|
| EP | 0 813 138 A1 | 6/1997 |
| EP | 1 239 672 A2 | 9/2002 |

(Continued)

*Primary Examiner* — Tuyetlien Tran
*Assistant Examiner* — Abimbola Ayeni
(74) *Attorney, Agent, or Firm* — Fitzpatrick, Cella, Harper & Scinto

(57) ABSTRACT

A method of browsing an ordered set of items on a display device is disclosed. The method displays the ordered set of items as ordered subsets (301-308) of the items, the subsets being arranged in parallel, each subset comprising a corresponding number (310, 311, 312) of a plurality of the items. The method selects one item (310) from one subset (305) as a focus item. The method then spatially separates the items preceding and the items following the focus item in the ordered set and displays the focus item in a different relative spatial arrangement (702) compared to the remaining displayed items.

14 Claims, 14 Drawing Sheets

U.S. PATENT DOCUMENTS

| | | |
|---|---|---|
| 7,107,532 B1 | 9/2006 | Billmaier et al. ............. 715/720 |
| 7,119,819 B1* | 10/2006 | Robertson et al. ............ 715/782 |
| 7,152,209 B2 | 12/2006 | Jojic et al. .................... 715/720 |
| 7,383,503 B2* | 6/2008 | Banks ............................ 715/273 |
| 7,548,936 B2* | 6/2009 | Liu et al. ............................ 1/1 |
| 7,681,141 B2 | 3/2010 | Tu .................................. 715/784 |
| 7,698,654 B2 | 4/2010 | Fong et al. .................... 715/810 |
| 7,707,137 B2* | 4/2010 | Nazarian et al. ............. 707/752 |
| 7,735,104 B2 | 6/2010 | Dow et al. ........................ 725/52 |
| 7,797,641 B2* | 9/2010 | Karukka et al. .............. 715/802 |
| 7,810,046 B2* | 10/2010 | Hiraoka et al. ............... 715/810 |
| 7,814,436 B2 | 10/2010 | Schrag et al. ................. 715/851 |
| 8,112,711 B2 | 2/2012 | Ackley .......................... 715/716 |
| 2001/0012023 A1 | 8/2001 | Kobayashi et al. ........... 345/835 |
| 2002/0033848 A1* | 3/2002 | Sciammarella et al. ...... 345/838 |
| 2002/0054059 A1 | 5/2002 | Schneiderman .............. 345/700 |
| 2002/0118169 A1 | 8/2002 | Hinckley et al. ............. 345/163 |
| 2003/0033296 A1 | 2/2003 | Rothmuller et al. ............ 707/3 |
| 2003/0128228 A1* | 7/2003 | Crow et al. ................... 345/716 |
| 2003/0218637 A1 | 11/2003 | Sloo et al. ..................... 715/810 |
| 2004/0021694 A1 | 2/2004 | Doar ............................. 345/784 |
| 2004/0100479 A1* | 5/2004 | Nakano et al. ................ 345/700 |
| 2004/0153446 A1 | 8/2004 | Castronova et al. ............ 707/3 |
| 2004/0160458 A1 | 8/2004 | Igarashi et al. ............... 345/660 |
| 2005/0010953 A1 | 1/2005 | Carney et al. ................... 725/61 |
| 2005/0091596 A1* | 4/2005 | Anthony et al. .............. 715/712 |
| 2005/0091597 A1 | 4/2005 | Ackley .......................... 715/716 |
| 2005/0102610 A1* | 5/2005 | Jie ................................. 715/513 |
| 2005/0160375 A1* | 7/2005 | Sciammarella et al. ...... 715/838 |
| 2005/0187976 A1 | 8/2005 | Goodman et al. ......... 707/104.1 |
| 2005/0206658 A1 | 9/2005 | Fagans .......................... 345/660 |
| 2005/0251748 A1 | 11/2005 | Gusmorino et al. .......... 715/713 |
| 2005/0251760 A1 | 11/2005 | Sato et al. ..................... 715/856 |
| 2005/0257166 A1 | 11/2005 | Tu .................................. 715/787 |
| 2005/0278656 A1* | 12/2005 | Goldthwaite et al. ........ 715/810 |
| 2006/0117356 A1 | 6/2006 | Jojic et al. ........................ 725/88 |
| 2006/0236362 A1 | 10/2006 | Istvan et al. ................... 725/135 |
| 2006/0271870 A1 | 11/2006 | Anwar .......................... 715/764 |
| 2007/0136286 A1 | 6/2007 | Webster et al. .................... 707/7 |
| 2007/0162853 A1* | 7/2007 | Weber et al. .................. 715/719 |
| 2007/0198476 A1 | 8/2007 | Farago et al. ..................... 707/3 |
| 2007/0204238 A1* | 8/2007 | Hua et al. ...................... 715/838 |
| 2007/0226646 A1 | 9/2007 | Nagiyama et al. ............ 715/784 |
| 2008/0062141 A1* | 3/2008 | Chandhri ....................... 345/173 |
| 2008/0066013 A1* | 3/2008 | Brodersen et al. ............ 715/836 |
| 2008/0066016 A1* | 3/2008 | Dowdy et al. ................. 715/854 |
| 2008/0122870 A1* | 5/2008 | Brodersen et al. ............ 345/634 |
| 2008/0148152 A1 | 6/2008 | Blinnikka et al. ............ 715/719 |
| 2008/0150892 A1 | 6/2008 | Duhig et al. .................. 345/156 |
| 2008/0155474 A1 | 6/2008 | Duhig ............................ 715/830 |
| 2008/0155475 A1 | 6/2008 | Duhig ............................ 715/830 |
| 2008/0158261 A1 | 7/2008 | Gould ............................ 345/666 |
| 2008/0313214 A1 | 12/2008 | Duhig et al. .................. 707/102 |
| 2009/0013280 A1 | 1/2009 | Ballard ......................... 715/783 |
| 2009/0070710 A1* | 3/2009 | Kagaya et al. ................ 715/810 |
| 2009/0100373 A1 | 4/2009 | Pixley et al. .................. 715/786 |
| 2009/0327891 A1* | 12/2009 | Holm et al. ................... 715/716 |
| 2010/0175026 A1* | 7/2010 | Bortner et al. ................ 715/818 |
| 2010/0333025 A1* | 12/2010 | Roberts ......................... 715/823 |

FOREIGN PATENT DOCUMENTS

| | | |
|---|---|---|
| EP | 1 667 013 A2 | 11/2005 |
| WO | WO 01/29702 | 4/2001 |
| WO | WO 02/17060 A1 | 2/2002 |

* cited by examiner

SCROLLING BROWSER WITH PREVIEWING AREA

CROSS-REFERENCE TO RELATED PATENT APPLICATIONS

This application claims the right of priority under 35 U.S.C. §119 based on Australian Patent Application No. 2006252194, filed Dec. 21, 2006, which is incorporated by reference herein in its entirety as if fully set forth herein.

FIELD OF INVENTION

The present invention relates to the presentation of items, such as audiovisual items, in a computerised collection and, in particular, to a method of scrolling such items in an efficient and effective manner.

BACKGROUND

With the advent and huge popularity of image scanners, video capture cards and digital still and video cameras, it is common for people to store a large number of photographs and other documents on personal computers and other computer related devices. There is a need for users of these devices to be able to access and navigate through their documents to view items and to visually search for items.

Modern computing systems often provide a variety of methods for viewing large collections of documents which can be controlled computer interface control devices including a mouse and pointer, and also by keyboard input, or other physical controls such as scroll wheels, as found on some mouse devices. The methods generally provide a means to select a location within a storage structure and return the set of items within that location or to return a set of items matching a certain query. A viewing area is then used to display representations of items from the set, typically in a sequence. For large sets it is common that only a limited number of the items in the set be viewed in the viewing area at any one time. The user can use the mouse and pointer or other input control device to execute commands which move items through the viewing area so that items earlier or later in the sequence are displayed. The action of visually moving items through or past a display area is herein referred to as "scrolling". The action of controlling scrolling for the purpose of exploring a set is herein referred to as "browsing". These terms are widely known in the art according to these general definitions.

Some systems for browsing and viewing images and other digital media collections have an interface which provides a relatively small thumbnail presentation of each item, together with some means to select individual items to afford a larger preview of the selected item. These systems require the user to focus on two different areas—one for selection and one for preview.

Another interface approach for selecting and previewing is to distort the proportions of the selected item so that the selected item is shown much larger, and the adjacent items in the collection are either occluded or compressed. All items of the collection remain represented in the same arrangement, but the selection affects the relative size on the display of the selected item, and sometimes those items which are close to the selected item. These interfaces may also include scrolling function permitting the user the ability to traverse or search the collection.

Accordingly, systems for scrolling through sets of items can demand different configurations for different situations. ISO9241 defines the usability of a system as comprising the efficiency, effectiveness and satisfaction which a user experiences when interacting with the system. The prior art described demonstrates that efficiency, effectiveness and satisfaction for a scrolling interface can be affected by the configuration chosen related to the device used.

SUMMARY

It is an object of the present invention to substantially overcome or at least ameliorate one or more deficiencies of existing arrangements.

In accordance with one aspect of the present invention, there is disclosed a method of browsing an ordered set of items on a display device, said method comprising the steps of:

displaying the ordered set of items as ordered subsets of the items, the subsets being arranged in parallel, each subset comprising a corresponding number of a plurality of the items;

selecting one item from one subset as a focus item; and spatially separating the items preceding and the items following the focus item in the ordered set and displaying the focus item in a different relative spatial arrangement compared to the remaining displayed items.

Generally, the selecting comprises selecting the one item from the one subset in order. Desirably the focus item is displayed at a size perceptibly larger that a size of the remaining displayed items. Preferably the method further comprises the step of detecting a user input to select a next item in the ordered set as a new focus item and repeating spatially separating to display the new focus item in the different relative spatial arrangement. Desirably, the displayed focus item substantially defines the spatial separation. Also, excepting the focus item, the spatially separating display step substantially maintains the relative spatial arrangement of all remaining displayed items including the displayed ordering of the items within the subsets. Desirably the focus item remains in a substantially constant display location during the browsing. Further preferably during display of one focus item, at least one further item of the corresponding subset is displayed in a location displaced from uniformity relative to the remainder of the subsets.

Other aspects are also disclosed.

BRIEF DESCRIPTION OF THE DRAWINGS

Some aspects of the prior art and one or more embodiments of the present invention will now be described with reference to the drawings, in which.

DETAILED DESCRIPTION INCLUDING BEST MODE

Disclosed is a method for browsing a collection of items stored in a digital system. The items may include images (such as bitmap or graphic), sounds (such as speech, music or songs), video (such as movies or animations), documents or data records, to name but a few. The actual storage of such collections of items in digital systems is well known. Items are typically stored in a hierarchical file system or a database structure on a storage medium such as a hard disk, optical disk or random access memory (RAM). Such storage may be accessible via a computer or communications network.

The methods of browsing a collection of data files or items to be described may be practiced using a general-purpose computer system 800, such as that shown in FIG. 8 wherein the processes to be described with reference to the remaining figures may be implemented as software, such as an application program executing within the computer system 800. In particular, the steps of the browsing methods are effected by instructions in the software that are carried out by the computer. The instructions may be formed as one or more code modules, each for performing one or more particular tasks. The software may also be divided into two separate parts, in which a first part performs the actual browsing and searching methods, and a second part manages a user interface between the first part and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for browsing a collection of data items.

Figure 8:
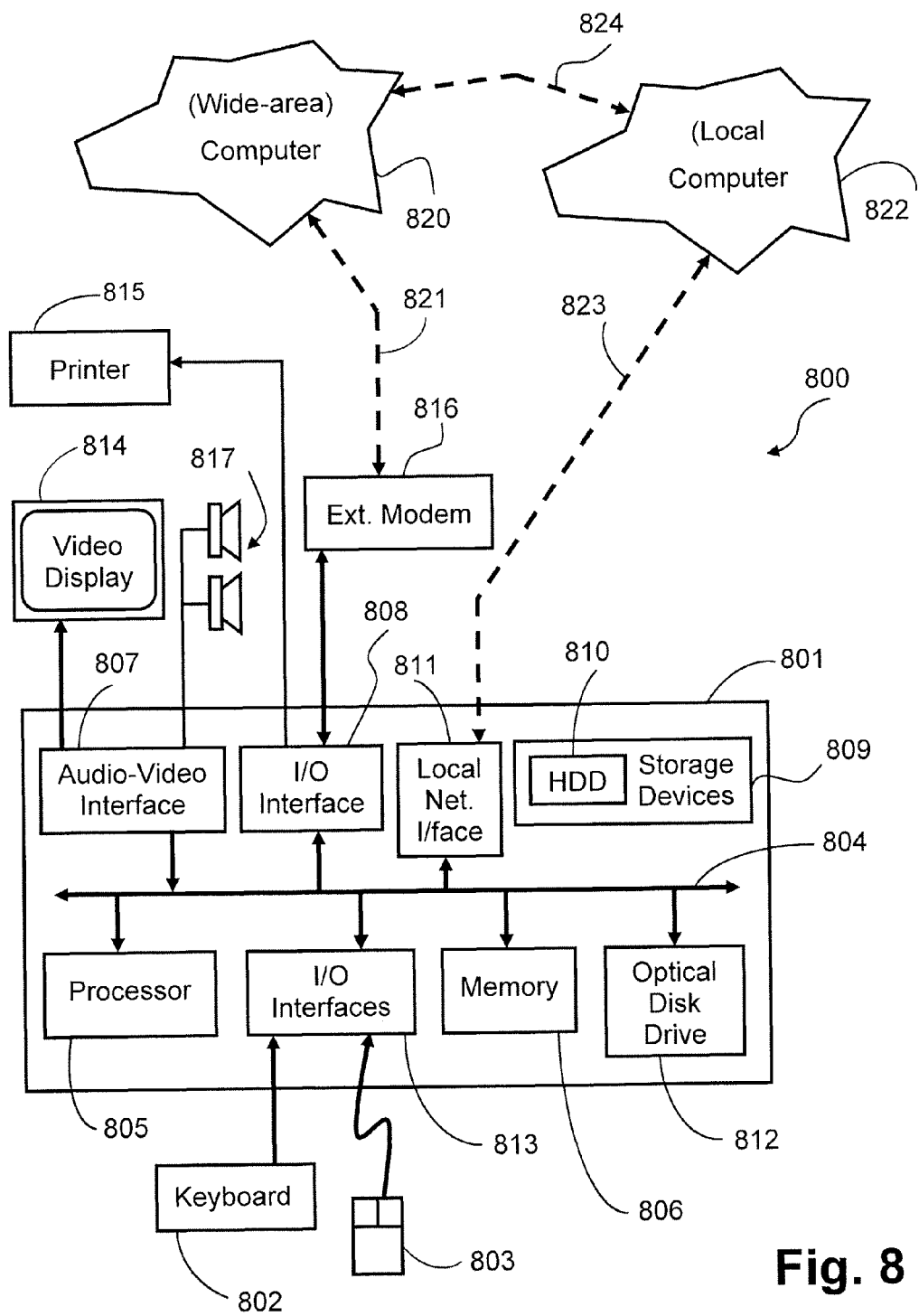
FIG. 8 is a schematic block diagram representing a general purpose computer upon which the described arrangements may be implemented.

As seen in FIG. 8, the computer system 800 is formed by a computer module 801, input devices such as a keyboard 802 and a mouse pointer device 803, and output devices including a printer 815, a display device 814 and loudspeakers 817. An external Modulator-Demodulator (Modem) transceiver device 816 may be used by the computer module 801 for communicating to and from a communications network 820 via a connection 821. The network 820 may be a wide-area network (WAN), such as the Internet or a private WAN. Where the connection 821 is a telephone line, the modem 816 may be a traditional "dial-up" modem. Alternatively, where the connection 821 is a high capacity (eg: cable) connection, the modem 816 may be a broadband modem. A wireless modem may also be used for wireless connection to the network 820.

The computer module 801 typically includes at least one processor unit 805, and a memory unit 806 for example formed from semiconductor random access memory (RAM) and read only memory (ROM). The module 801 also includes an number of input/output (I/O) interfaces including an audio-video interface 807 that couples to the video display 814 and loudspeakers 817, an I/O interface 813 for the keyboard 802 and mouse 803 and optionally a joystick (not illustrated), and an interface 808 for the external modem 816 and printer 815. In some implementations, the modem 816 may be incorporated within the computer module 801, for example within the interface 808. The computer module 801 also has a local network interface 811 which, via a connection 823, permits coupling of the computer system 800 to a local computer network 822, known as a Local Area Network (LAN). As also illustrated, the local network 822 may also couple to the wide network 820 via a connection 824, which would typically include a so-called "firewall" device or similar functionality. The interface 811 may be formed by an Ethernet™ circuit card, a wireless Bluetooth™ or an IEEE 802.11 wireless arrangement. The keyboard 802 and the mouse 803 may be coupled to the computer module 801 by corresponding wired connections, or using wireless connections, such as radio frequency or infra-red connections, as illustrated by the corresponding dashed lines in FIG. 8.

The interfaces 808 and 813 may afford both serial and parallel connectivity, the former typically being implemented according to the Universal Serial Bus (USB) standards and having corresponding USB connectors (not illustrated). Storage devices 809 are provided and typically include a hard disk drive (HDD) 810. Other devices such as a floppy disk drive and a magnetic tape drive (not illustrated) may also be used. An optical disk drive 812 is typically provided to act as a non-volatile source of data. Portable memory devices, such optical disks (eg: CD-ROM, DVD), USB-RAM, and floppy disks for example may then be used as appropriate sources of data to the system 800.

The components 805, to 813 of the computer module 801 typically communicate via an interconnected bus 804 and in a manner which results in a conventional mode of operation of the computer system 800 known to those in the relevant art. Examples of computers on which the described arrangements can be practised include IBM-PC's and compatibles, Sun Sparcstations, Apple Mac™ or alike computer systems evolved therefrom.

Typically, the application programs discussed above are resident on the hard disk drive 810 and read and controlled in execution by the processor 805. Intermediate storage of such programs and any data fetched from the networks 820 and 822 may be accomplished using the semiconductor memory 806, possibly in concert with the hard disk drive 810. In some instances, the application programs may be supplied to the user encoded on one or more CD-ROM and read via the corresponding drive 812, or alternatively may be read by the user from the networks 820 or 822. Still further, the software can also be loaded into the computer system 800 from other computer readable media. Herein, the term "computer readable storage media" refers to any storage medium that participates in providing instructions and/or data to the computer system 800 for execution and/or processing. Examples of such storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 801. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The second part of the application programs and the corresponding code modules mentioned above may be executed to implement one or more graphical user interfaces (GUIs) to be rendered or otherwise represented upon the display 814. Through manipulation of the keyboard 802 and the mouse 803, a user of the computer system 800 and the application may manipulate the interface to provide controlling commands and/or input to the applications associated with the GUI(s). Generally the GUIs include icons or regions that, when appropriately selected using either or both of the keyboard 802 and mouse 803, provide for user control of the application program to achieve a desired function. Particularly, the mouse 803 typically affords two-dimensional positioning within a GUI and selection at a determinable location via user actuable switches 832 formed therein. In some instances the mouse 803 includes a scroll wheel 831 which, which actuated by the user, permits content within the GUI to be scrolled.

Whilst the computer system 800 may be used to implement the browsing arrangements to be described, such may also be configured in more specific user devices of smaller size or limited application. Such specific user devices include, but are not limited to, portable/personal audio and/or video reproduction devices, for example utilizing MP3 or MPEG file formats.

Figure 1:
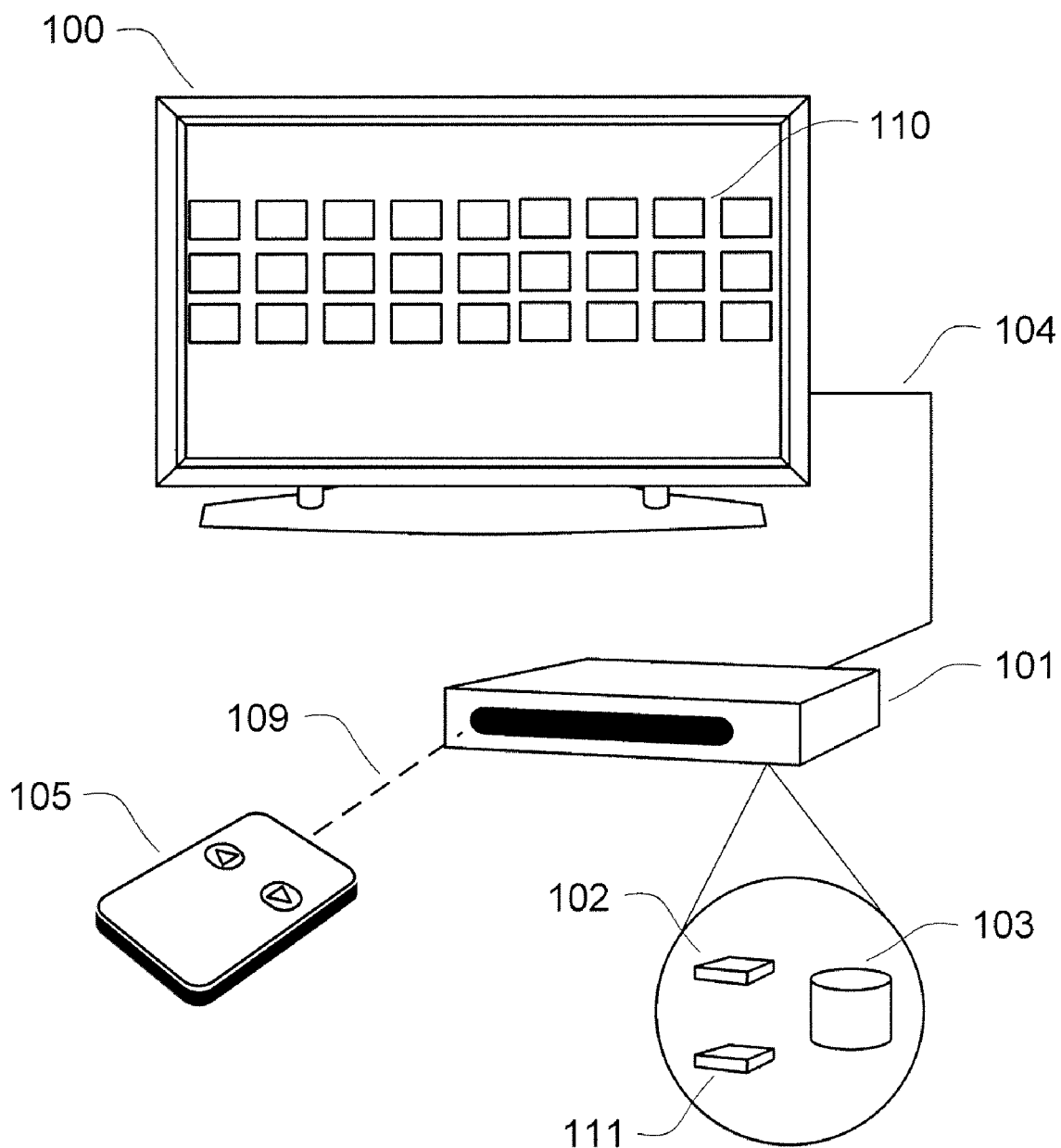
FIG. 1 is a system diagram showing a typical digital system for the reproduction of data items within which the arrangements presently described can he practiced.

FIG. 1 shows a digital system having a display 100 connected to a media device 101 by a connector 104. This connector may use wires or be wireless using radio or infrared signal. The media device 101 comprises at least a Central Processing Unit (CPU) 102 and a data storage system 103, typically configured in a manner akin to corresponding components of the computer 801 of FIG. 8 described above. The media device 101 may be a dedicated reproduction device, a device with additional capabilities such as a TV tuner, a set-top box, or a DVD player, or may be a general purpose Personal Computer (PC). The media device 101 may additionally contain a Graphics Processing Unit (GPU) 111 which is configured to assist in the rendering of a graphical user interface 110 to the display 100. The GPU 111 may support the execution of graphics libraries such as OpenGL, a registered trade mark of certain products manufactured by Silicon Graphics, Inc of U.S.A. The data storage system 103 typically stores a plurality of items represented in digital form. Alternatively, in network configured arrangements, such as a CATV set-top box arrangement, the device 101 may provide access via the network to the stored items.

An application program operating in accordance with the present disclosure and executed by the CPU 102, optionally assisted by the GPU 111, causes the user interface 110 to be rendered upon the display 100.

A control device 105, illustrated as hand-portable remote control, is operable by a user to transmit a signal 109 to the media device 101, wherein the signal is received by the CPU 102 and causes control events to occur which may result in changes to the state of the digital system and to the user interface 110 represented upon the display 100. The signal 109 may be an infra-red signal or a radio signal or alternatively the control device 105 may also be connected by one or more wires or may be integrated into the media device 101. The control device 105 may alternatively be a standard input device such as a keyboard or mouse, akin to those described above.

In some implementations, the Central Processing Unit (CPU) 102, the optional Graphics Processing Unit (GPU) 111 and the data storage system 103 may be contained directly within the chassis of the display 100, thereby eliminating the need for the media device 101 and the connector 104. In other implementation, the display 100 may be portable. Further, the functional components of the device 101 may be included in a device with additional capabilities, for example a digital camera, with the user interface 110 being rendered either on a display which is integrated into the device or on an external display. Some components and user controls may be shared between the browsing application and any additional capabilities of the device.

Figure 2:
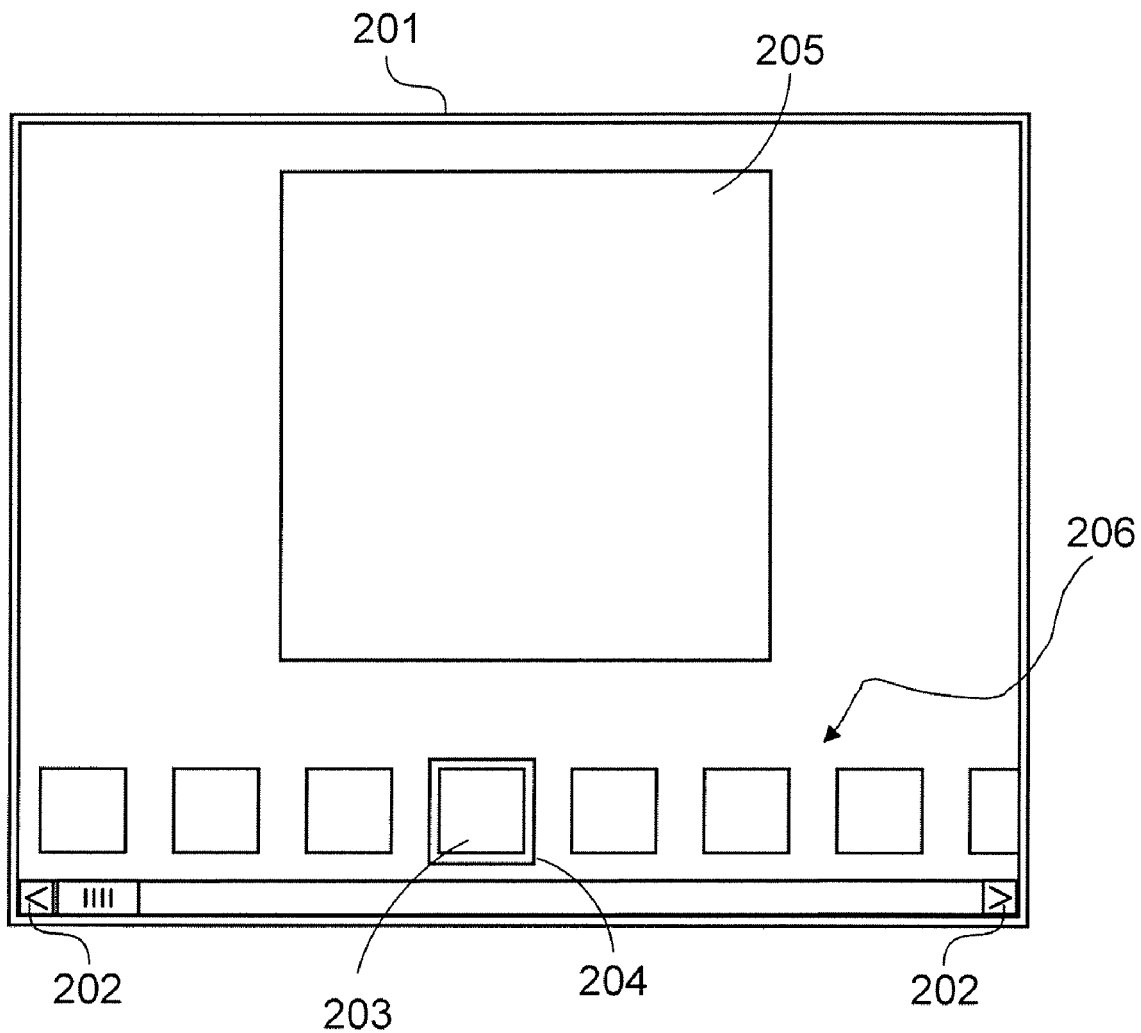
FIG. 2 shows an example of a prior art presentation showing a selection area and a preview area in a typical display application.

FIG. 2 shows a prior art arrangement for browsing a collection of image items which may be implemented in the computer system 800 via an appropriate software application. A viewing window 201 is displayed upon the display 814 and includes representations 206 of items of the collection in a single row or known "film-strip" mode. The window 201 has a scroll section including scroll icons 202 which may be used to scroll through the collection, where such is too large to fit within the window 201. One of the items represented, generally a centrally positioned item 203 may be termed a focus item and may be identified by a border 204 or some other means for highlighting that item amongst those represented in the film strip row. Further the interface of FIG. 2 provides and enlarged representation 205 of the focus item 203 to afford the user a better opportunity to see detail of that item. It will be appreciated that as the user scrolls through the collection, by actuating one of the icons 202 using, for example the mouse 803 and an associated cursor (not illustrated but well known in the art), each item will be moved into the focus item location 204 and will be represented in the enlarged form 205.

The presently disclosed arrangements involve animating objects on the display device 814. Different methods and approaches for performing animations on the display device 814 using software commands will be known to those skilled in the art. The present description therefore includes details of the visual effects of such animation, without recourse to the different options for the underlying software methods for performing such animation.

To improve the satisfaction and effectiveness of visual browsing of items in a collection or set, disclosed herein are interfaces that arrange the items into an order and then into a series of subsets each with equal numbers of items. The subsets are selected by scrolling items individually through a common preview area, in a so-called selection and preview mode. If the total number of items in the collection is not divisible by the number of items in each subset, then at least one subset will be incomplete. Each subset has a number of different possible relative arrangements—a default arrangement where no item in the subset is selected, and a number of presentation arrangements, one for each item in the subset whereby each presentation arrangement has a different item selected in the common preview area. This allows each item in the subset to be selected in turn and also for no items in the subset to be selected. By default, each subset is displayed with no item selected. One item in the ordered collection is selected and the subset containing that item is displayed in the appropriate way. The collection is ordered to provide for a sense of continuity of items in each subset, and also between adjacent subsets, thus facilitating searching. Ordering may be based on any one of a number of variables such a file name, file size, and date of creation or modification, to name but a few.

Figure 7A:
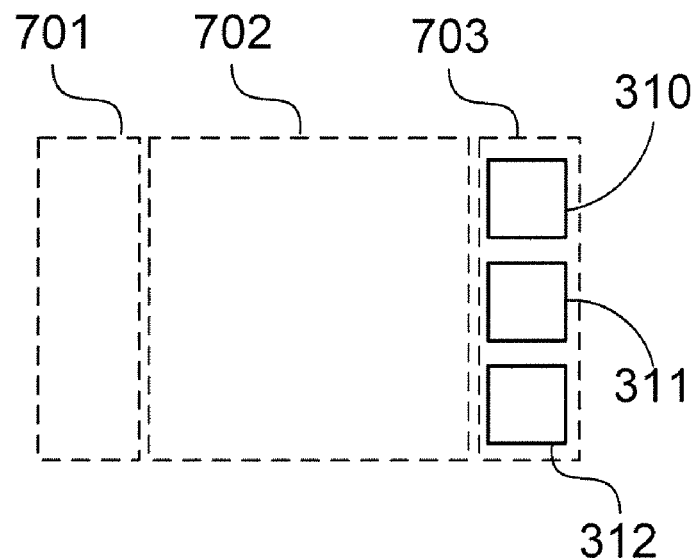
FIGS. 7A-7E show a detailed example of fifth display arrangement at different stages of scrolling within a single subset.
Figure 7B:
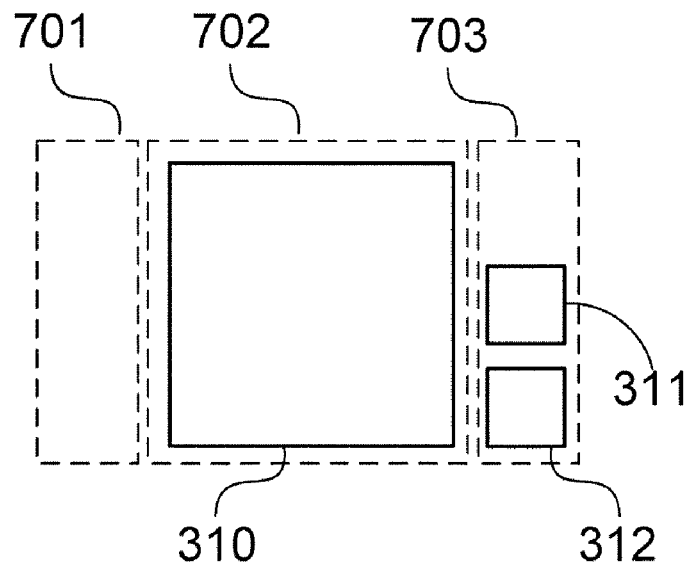
Figure 7C:
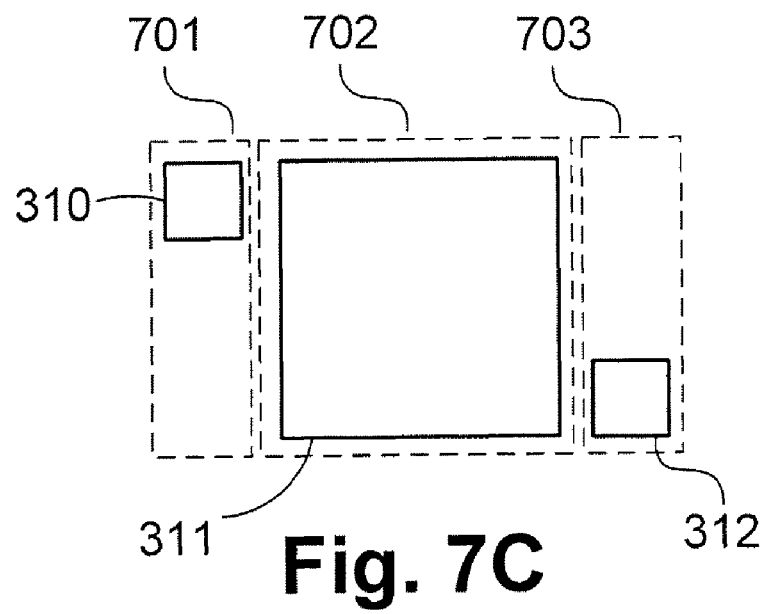

FIGS. 7A-7E show how a subset can be animated smoothly from the default arrangement through sequential selection of each item and return to the default arrangement on the other side of a common preview area. FIG. 7A shows a subset of three items 310, 311 and 312 arranged in a default mode where all three items are arranged in a ordered stack in the area marked by the box 703. FIG. 7B shows item 310 selected whereby item 310 has been animated and moved from its default location at the top of the stack in area 703 to occupy substantially all of the larger selection display area 702, described above as a "common preview area". The item 310 in this respect is presented as a focus item, to which the user's attention is drawn. Next, FIG. 7C shows item 311 selected where item 311 has been animated to occupy substantially all of the area 702 and item 310 has been animated to a default position in area 701 corresponding to the position previously occupied in area 703. As each item is animated from unselected to selected, and then to unselected, it occupies the same relative position in the default arrangement on either side of the selection display area 702. This reduces the mental load on the user to visually track items as the selection changes and the series of subsets scroll across the display.

Figure 7D:
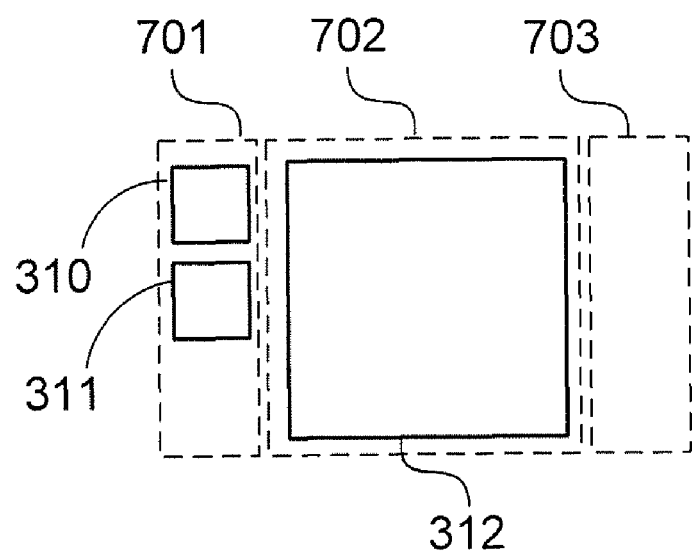
Figure 7E:
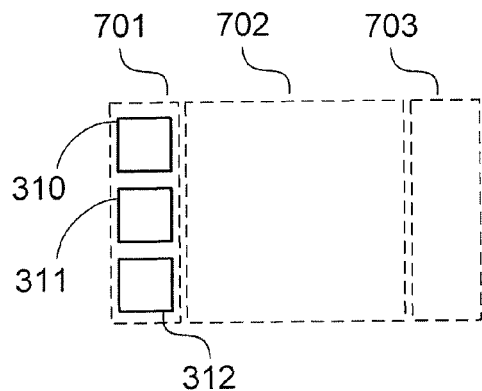

FIG. 7D shows item 312 selected and item 311 moved to its default position in the area 701. FIG. 7E shows the next position where the stack has returned to the default arrangement but entirely within the area 701. Through the course of animating the sequence of items through the selection area 702 the subset has moved across the display from region 703 to region 701.

Figure 3A:
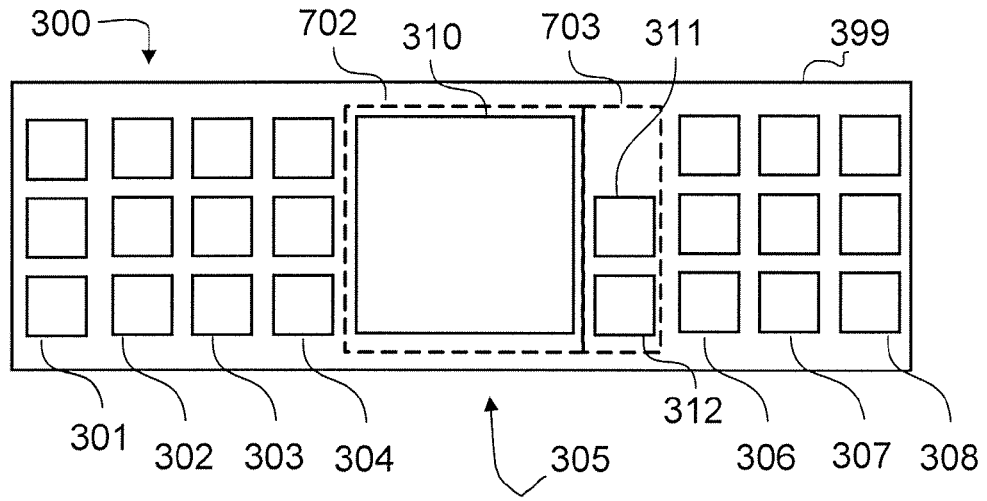
FIGS. 3A-3D show examples of a first display arrangement according to the present disclosure at different stages of scrolling.

In a preferred implementation, the subsets and the animation shown in FIG. 7A-7E are formed within a display window arranged for scrolling the collection in a sequence of equally spaced parallel sets. This affords a 2-dimensional representation of the subsets of items within the collection. FIG. 3A shows a scrolling interface 300 having a display window 399. User selectable scrolling icons such as those shown in FIG. 2 are not illustrated but may be included for use, or alternate means arranged to control scrolling, as known in the art. Not illustrated, but as an input to the interface 300, items within the collection are preferably initially ordered according to some sort order. The items are then arranged in subsets 302, 303, 304, 305, 306, 307 and 308 arranged in a vertically parallel pattern formed by using the same relative spatial arrangement for each subset, hereby referred to as the standard arrangement. Items within each subset remain ordered, for example from top to bottom of each column seen in FIG. 3A and from left to right for the entire set or collection. In the example of FIG. 3A, each subset comprises three items each having a corresponding display location in the subset. Each subset in the present example therefore has four relative arrangements in which it can be displayed.

One subset 305 is the active subset comprising items 310, 311 and 312 with item 310 being the currently selected item. The currently selected item 310 is shown in a large preview whilst the other items in the subset 311 and 312 remain in the locations consistent with the standard arrangement and the configuration of FIG. 7B described above. In order to efficiently accommodate the larger preview within the active subset, the space between the subsets 304 and 306 (ie. the subsets adjacent to set 305) is increased. The spacing between subsets is nevertheless maintained at a common size. Scrolling therefore occurs from right to left in this example. FIG. 3A therefore shows the first of the four relative arrangements for a subset in the present example.

Figure 3B:
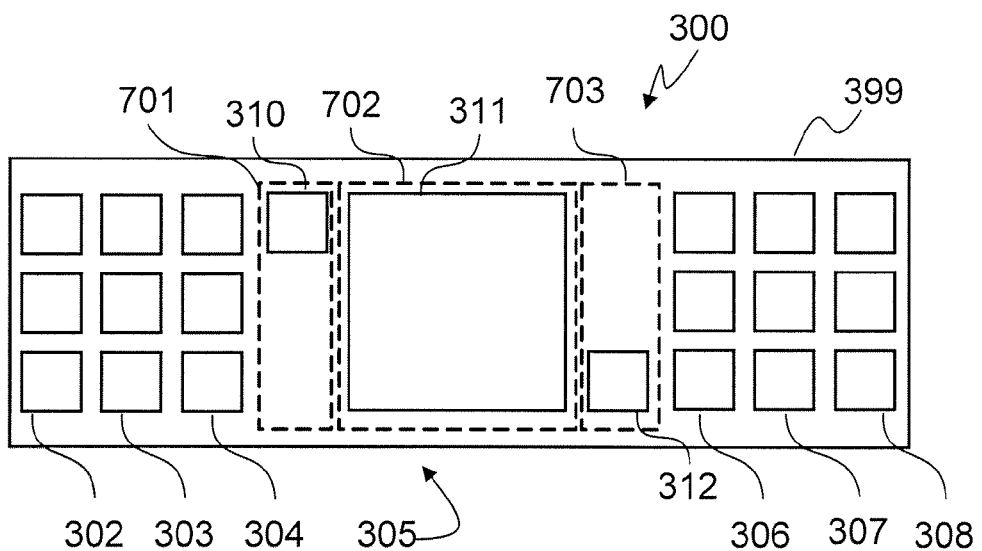

The active subset 305 adapts further in response to scrolling inputs which select the subsequent items 311 and then 312 in the subset. FIG. 3B shows the next item in the sequence (when considered from left to right) 311 as the active focus item. Item 310 has moved to the opposite side of the selected item preview area and the subsets 302, 303 and 304 have moved accordingly to accommodate the widening of the active subset. Set 301 has moved out of the viewing area 399, consistent with a scrolling view of the collection according to the present disclosure. The viewing area 399 maintains a constant size and configuration and, unlike the viewing area 201 of the prior art, has little or no apparent wasted space. FIG. 3B therefore shows the second of the four relative arrangements for a subset in the present example.

Figure 3C:
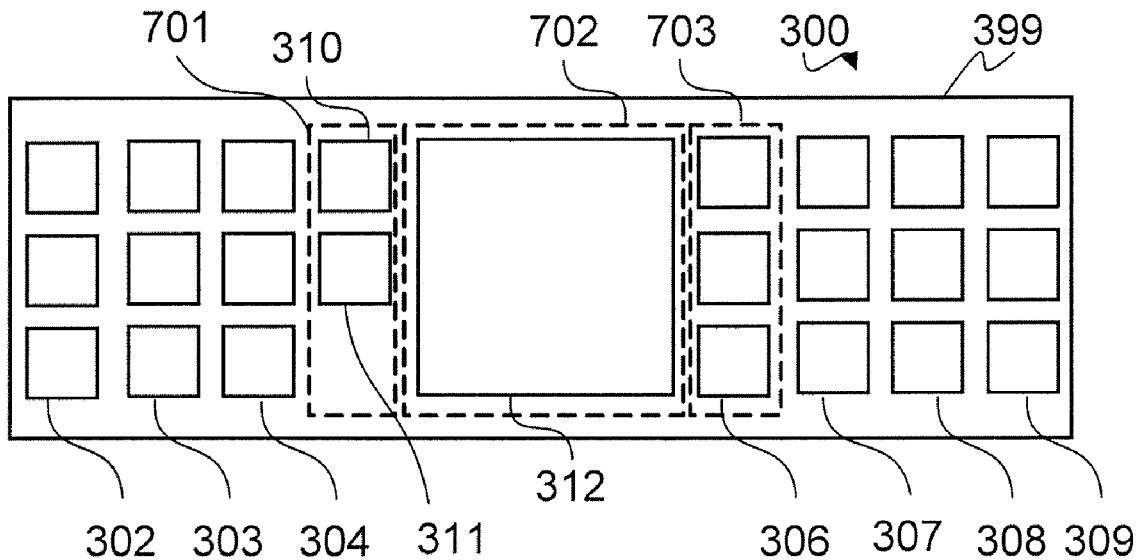

FIG. 3C shows the subsequent selection of the next item 312 in the active subset arising from a scrolling command to the position 702 of focus item. Items 310 and 311 have now both moved into the normal position in the standard arrangement and the subsets 306, 307 and 308 have moved into the area 703 in response to the change in width of the active subset. A previously unseen subset 309 has moved into the viewing area 399. FIG. 3C therefore shows the third of the four relative arrangements for a subset in the present example.

Figure 3D:
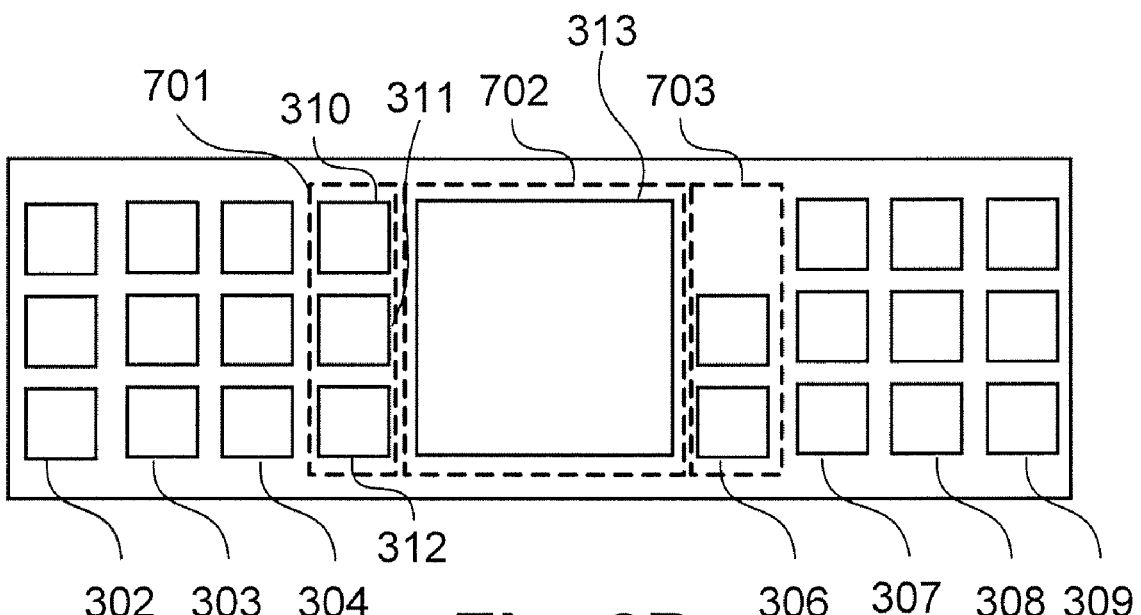

FIG. 3D shows the selection of the next item in the series which is the first item 313 of the previously inactive subset 306 which has now become the active subset and appears in the same arrangement as shown in FIG. 3A of the previously active subset comprising items 310, 311 and 312. The previously active subset 305 is now displayed in the standard arrangement. FIG. 3D therefore shows the fourth of the four relative arrangements for a subset in the present example. Its will be appreciated from FIGS. 3A-3D that, with the exception of when a particular item is the focus item and displayed in a larger format, each item occupies the same display location within the subset irrespective of the relative position of that location with respect to the focus item.

FIGS. 3A-3D therefore demonstrate how a subset adapts from the standard arrangement with a first spatial configuration of items through a number of stages equal to the number of items in the subset each stage having a different relative spatial configuration of items within the subset. At each stage, all except one item is displayed in the standard arrangement at one or the other side of the preview area 702. The described animations do not change the relative positions of items within the set or subset when displayed in the standard arrangement either before, during or after the animations. This is useful to the user when scanning the collection and returning to previously viewed items as the contextual position of any one item and any one subset is maintained whilst scrolling proceeds in either direction.

In the arrangements of FIGS. 3A-3D, the change between representations is a response to a scrolling command received via some user input. Each change may be via a discrete input, such as a single mouse click or key depression, such that the transitions illustrated would require at least 3 user actions, in a "click-by-click", or one transition per action manner, each action selecting a new focus item. Alternately, a single user command may be used to commence continuous or continue scrolling, which may then be stopped by a further user command or action. Such may involve a click, or a depression and holding of a key, and then a release of the key.

The presently disclosed scrolling display process is different to prior art distortion interfaces because of the unique manner in which the active set is adapted wherein the items of the set are arranged in a different spatial relationship with each other, as the items in the set are individually and sequentially selected, whilst maintaining the perceptible ordering of the entire collection.

The presently disclosed scrolling display process is different to prior art scrolling lists such as "fisheye" menus because of the unique method used to maintain the relative position of certain items to others items in the set and subset before and after selection, in order to aid spatial recognition of items.

The presently disclosed scrolling display process is different to prior art interfaces where the selected item is magnified and occludes other items in the set because of the unique manner in which the items preceding and proceeding the selected item are moved to reduce the amount of occlusion that would otherwise occur.

Figure 5:
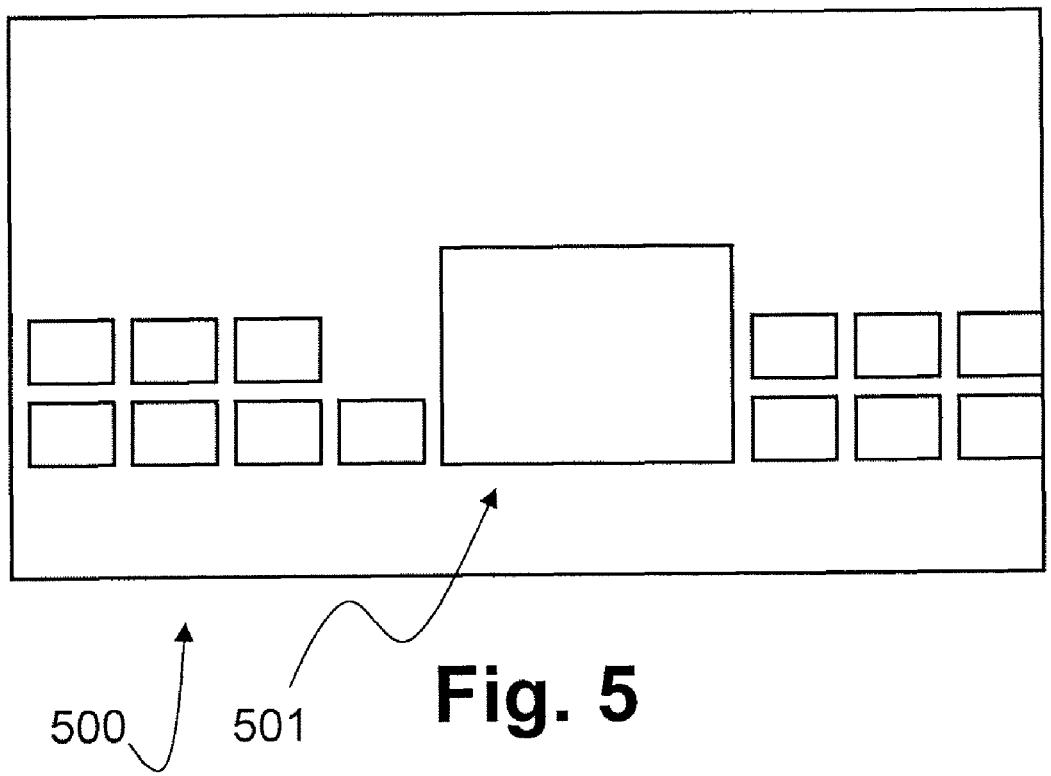
FIG. 5 is an example of a third display arrangement.
Figure 6:
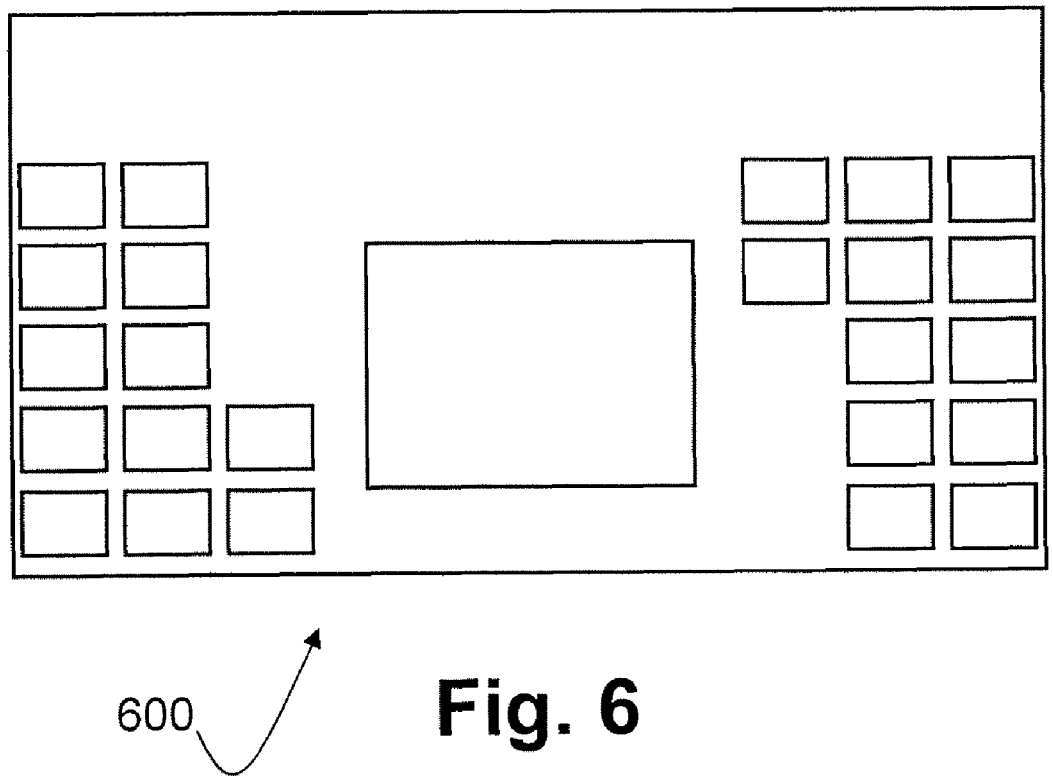
FIG. 6 is an example of a fourth display arrangement.

Scrollable interfaces according to the present disclosure are not limited to subsets of three items or to preview areas which show the selected item as the same height as a subset of items. FIGS. 5 and 6 show arrangements with different numbers of rows and with selected items of different sizes relative to a subset of items. FIG. 5 shows an interface 500 with items scrolling from left to right, where the selected item 501 is of a size larger that the two rows of items, which define subsets each of two items. FIG. 6 shows an interface 600 where the selected item is represented at a size smaller that the size of the subsets.

It is also further possible in alternative implementations to arrange the subsets as rows, and to then animate the items vertically, instead of horizontally.

Figure 11A:
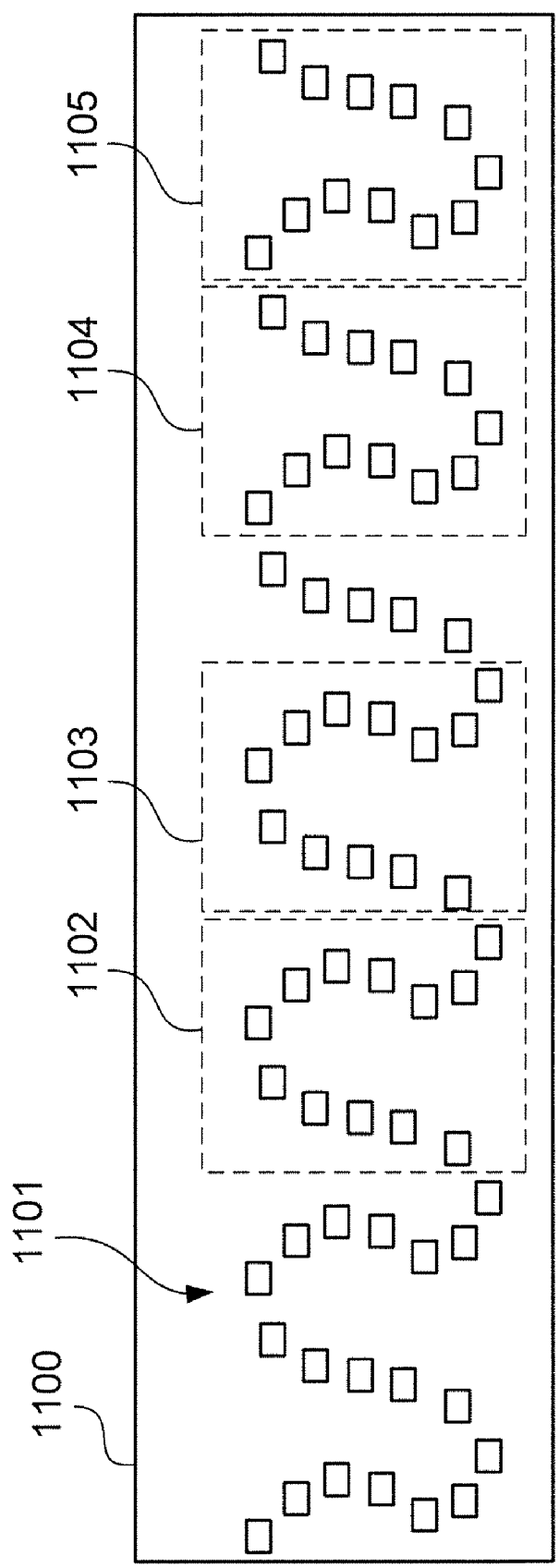
FIGS. 11A-11C show an alternate implementation with uniformly arranged subsets of images.
Figure 11B:
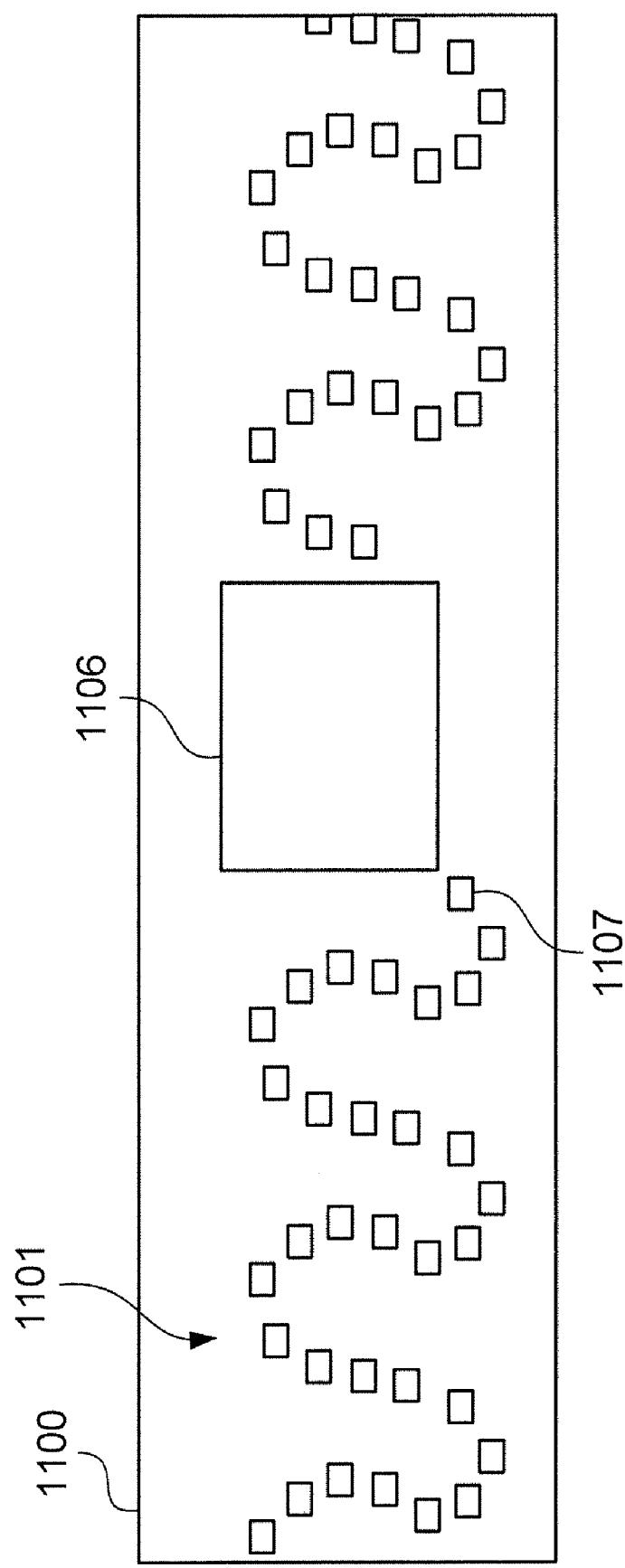
Figure 11C:
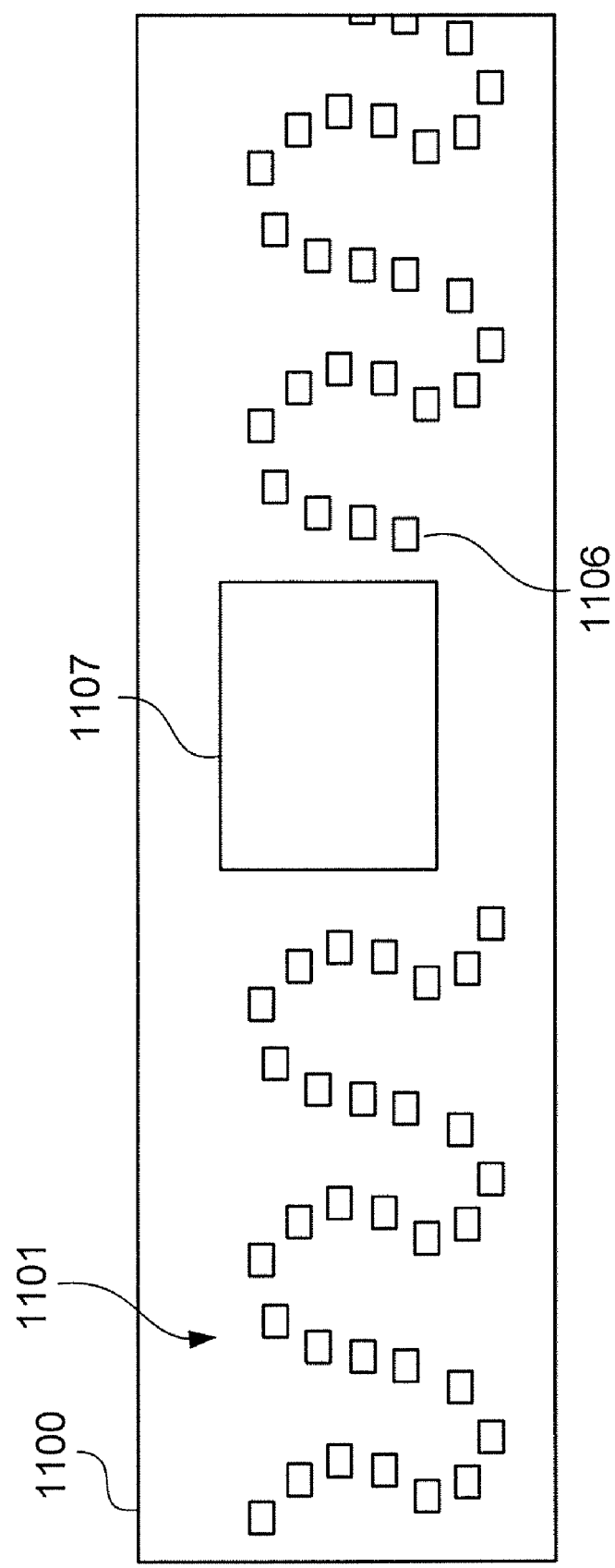

Further, items in the subsets may be arranged, not in a straight line, but instead arranged in a curve, or along an irregular path. Also items may be arranged in an irregular cluster, or in a pattern using items of different sizes. Many other options are possible and may be adapted to the specific implementation or collection being scrolled. For example in the embodiment shown in FIGS. 11A-11C the items are arranged in a scrollable repeating irregular pattern 1101 within a window area 1100. The pattern 1101 is a 2-dimensional repeating serpentine pattern which can be subdivided into parallel subsets with identical arrangements. For example it is possible to segment the pattern into a repeating subset shown by the identically shaped subsets 1102 and 1103 or alternatively the identically arranged subsets 1104 and 1105. If the pattern is repeating the pattern can be said to be made up of subsets which are arranged in parallel but which are nevertheless at least uniformly arranged in a perceptively identifiable fashion. Whilst the pattern shown in FIG. 11A is serpentine, other repeatable but non-uniform configurations of display locations may be devised. FIG. 11B shows the same arrangement 1101 with one item 1106 selected and the preceding and proceeding items accordingly re-arranged to accommodate the different relative spatial arrangement of the subset containing the selected item 1105. FIG. 11C shows the item 1107 adjacent to item 1106 selected and previously selected item 1106 has returned to the standard arrangement in a position and size comparable to its position prior to selection. In this unique manner the relative spatial arrangement of items is maintained before and after selection.

Figure 4:
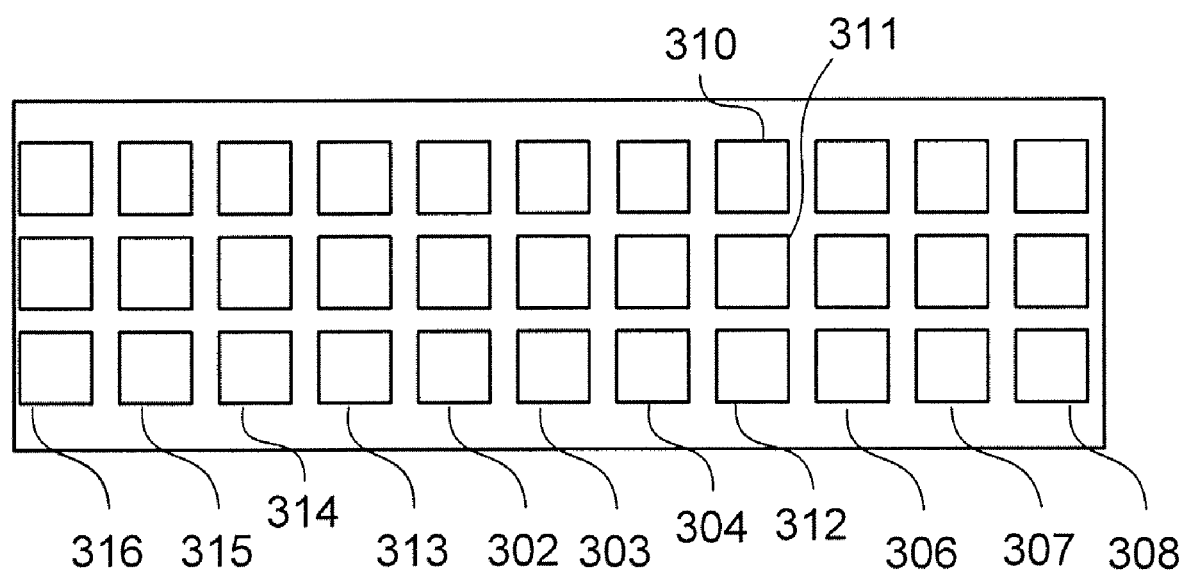
FIG. 4 is an example of a second scrolling arrangement.

The scrolling approach described above with reference to FIGS. 3A-3D is well suited to relatively slow scrolling as it affords the user time to adequately perceive the larger represented item, particularly if that item is an image. If the speed of scrolling is increased, the level of perception will diminish to the point of the animation and larger representation offering little or no added value. At higher speeds of scrolling, updating the visual disturbance caused by items growing and shrinking and animating in an irregular manner is also problematic. In such instances, a specific implementation includes a second scrolling mode wherein the active row returns to the standard arrangement and all subsets are scrolled through the viewing area without the creation of an active subset with a different spatial arrangement. This mode allows a user to move more quickly though a series to scan for items. The user can initiate this scrolling through user input and return to the selection and preview mode through further user input. The user input may be a mouse click or continued depression of a key of the keyboard 802 or the remote control 105. FIG. 4 shows a series of subsets, corresponding to those shown in FIGS. 3A-3D arranged for this scrolling mode.

The arrangements described may be implemented as described upon general purpose computer systems such as that shown in FIG. 8, and can be particularly beneficial in systems such as that shown in FIG. 1 where the primary user control, being the remote control unit 105, is of relatively simple configuration with a limited number and/or range of controlling options available.

Figure 9A:
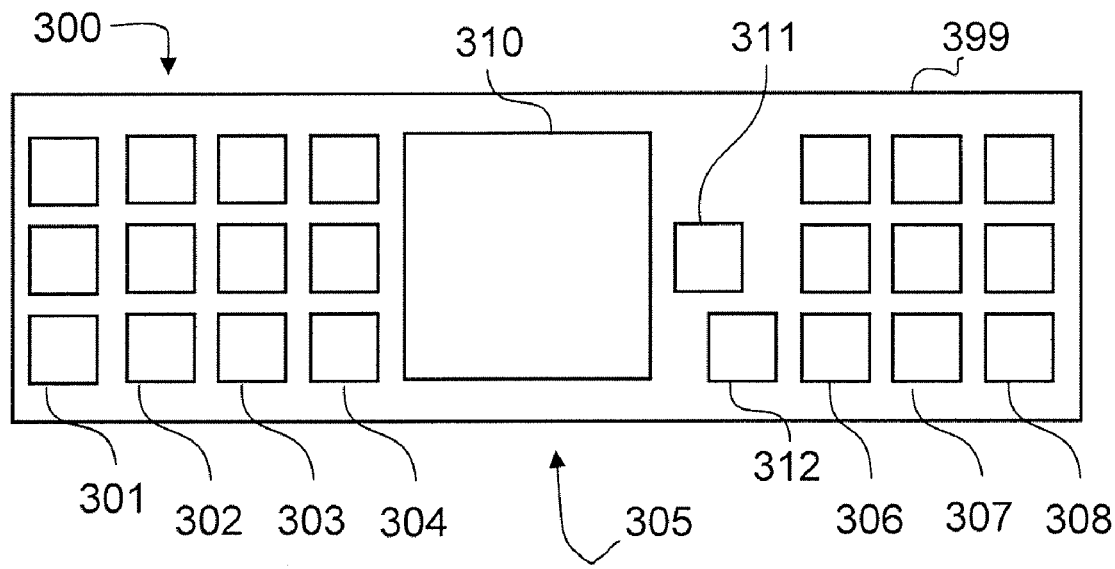
FIGS. 9A and 9B show an alternate implementation in which anticipated and following "movements' of items in the interface are represented.
Figure 9B:
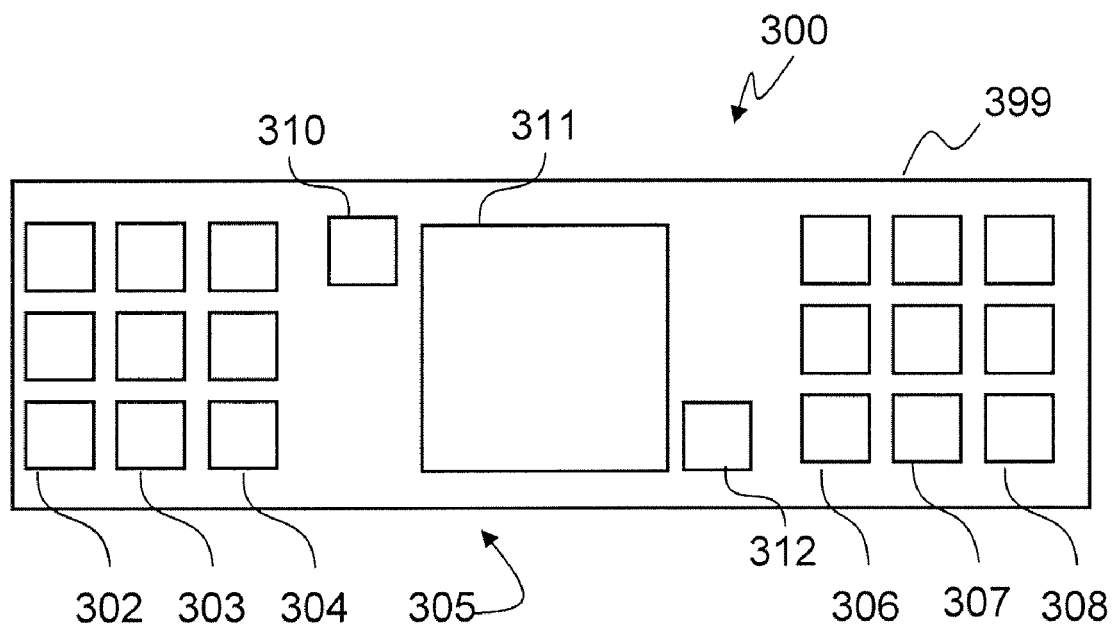

A modification of the arrangements of FIGS. 3, 5, 6 and 7 may be made to increase or aid the user perceptibility of the movement of the ordered items through the animation sequence. As shown in FIG. 9A, for the subset undergoing animation as the selected subset, and assuming right to left scrolling like that of FIG. 3A and 3B, the item 311 in the area 703 (not seen here for clarity) that is next due to move to the preview area 702, is animated to a slightly displaced location to visually pre-empt the more substantive animation that is about to take place. The slightly displaced location contrasts the uniformity of the items in the remaining subsets represented in the viewing window 399. Similarly, as shown in FIG. 9B, the item 310 that has just been moved from the preview area 702, is similarly shown slightly displaced to visually acknowledge the place from which it has just been moved.

Figure 10:
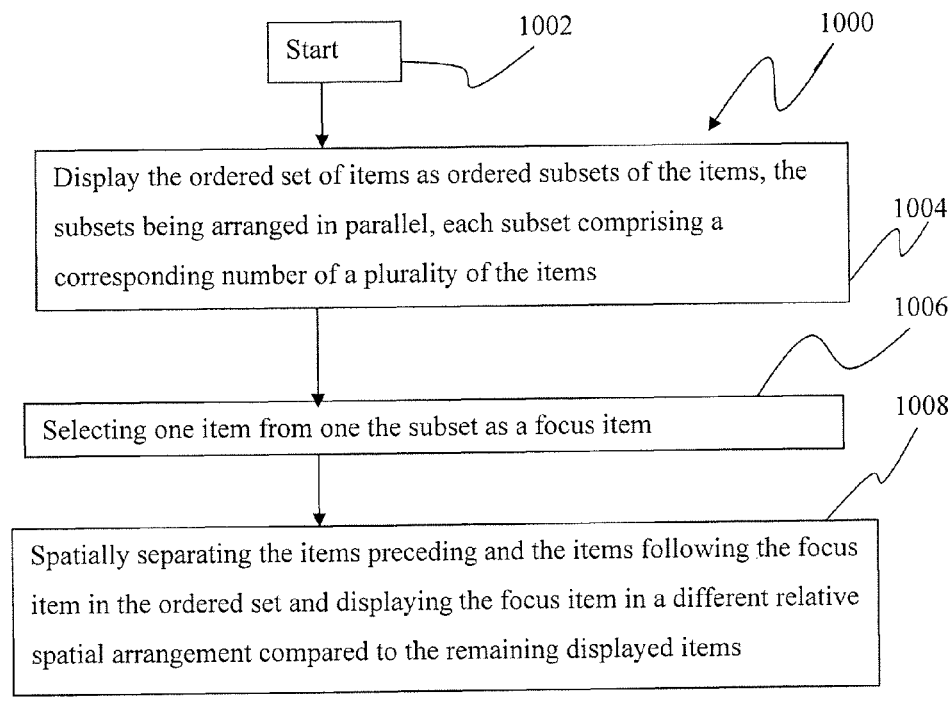
FIG. 10 is a flowchart of a method of performing a user interface.

FIG. 10 shows a flowchart of a method 1000 for browsing an ordered set of items on a display device, thus implementing the interface described above. The method 1000 is typically implemented as a software program executable by a computer and may be sub-program of a larger application. The method 1000 has an entry step 1002. In a next step 1004 the interface displays the ordered set of items as ordered subsets of the items, the subsets being arranged in parallel, each subset comprising a corresponding number of a plurality of the items. This may for example, give the arrangement show in FIG. 4. In a next step 1006, the interface selects, either automatically or under some user control, one item from one of the subsets. The selected item may be identified as a focus item. In a next step 1008, the method 1000 spatially separates the items preceding and the items following the focus item in the ordered set and displays the focus item in a different relative spatial arrangement compared to the remaining displayed items. This may for example be the arrangement shown in any one of FIGS. 3A-3D. This distinguishes the arrangement of FIG. 2 where the focus item (ie. 20) remains in the scrolling display of items, which are not arranged in sub-sets.

Industrial Applicability

The interface arrangements presently described are applicable to the computer and data processing industries, and particularly where collections of data items, such as photographs, are required to be scanned, or searched essentially manually relying upon user recognition of the representation of the items to identify items of interest.

The foregoing describes only some embodiments of the present invention, and modifications and/or changes can be made thereto without departing from the scope and spirit of the invention, the embodiments being illustrative and not restrictive.

For example, whilst the described implementations related to an ordered list of items (for example images ordered according to capture date), the list of items need not be ordered. However, the presently disclosed arrangements are premised upon the relative position of each item in the list, and within the corresponding subset, being individually fixed. This is to ensure that, during the scrolling of the list and the display of the focus item, each item in the list appears from and returns to the individual position of that item in the list and its corresponding subset.

I claim:

1. A display interface for scrolling items of a collection, each item having a corresponding individual position in the collection, said interface comprising at least a processor, memory and a display unit that cooperate to display:
- a focus display location at which a focus item is displayable, the focus item being one item of the collection; and
- first and second 2-dimensional repeating arrangements of the items spatially separated by the focus display location, the first arrangement preceding the focus display location in a direction of scroll and the second arrangement following the focus display location in the direction of scroll, each arrangement including a plurality of standard display locations at which a plural number of items of the collection are displayable adjacent the focus display location,
- wherein a first scroll instruction of the collection causes a first one of the items to depart a corresponding first standard display location in the first arrangement adjacent to the focus display location and to occupy the focus display location as the focus item,
- wherein an immediately following scroll instruction of the collection causes that first item to depart the focus location and to occupy, in the second arrangement adjacent to the focus display location, a standard display location corresponding to the first standard display location occupied by that first item in the first arrangement, such that as a consequence of the scroll instructions, each item progressively occupies the same relative position in the second arrangement as that occupied by the item in the first arrangement, having departed the focus display location, and
- wherein the immediately following scroll instruction causes a second item, immediately following the first item in the collection, to depart its standard display location in the first arrangement and to occupy the focus location as the focus item, such that the standard display location of the second item in the first arrangement becomes empty, while any items present at others of the standard display locations in the first arrangement remain where they are.

2. A display interface according to claim 1, wherein the focus item is presented within the focus location in a different spatial relationship to those items presented within the standard display locations of the first and second arrangements.

3. A display interface according to claim 1, wherein the 2-dimensional repeating arrangements comprise parallel arranged stacks of display locations within which representations of the items are displayable.

4. A display interface according to claim 1, wherein the 2-dimensional repeating arrangements comprise a repeating non-uniform configuration of the standard display locations within which representations of the items are displayable.

5. A display interface according to claim 1, wherein the items in the collection are in an order and the display locations are populated by the items in the order.

6. A method of scrolling items of a collection, each item having a corresponding individual position in the collection, said method comprising steps of:
- displaying a focus item in a focus display location, the focus item being one of the collection;
- displaying first and second 2-dimensional repeating arrangements of the items spatially separated by the focus display location, the first arrangement preceding the focus display location in a direction of scroll and the second arrangement following the focus display location the direction of scroll, each arrangement including a plurality of standard display locations at which a plural number of items of the collection are displayable adjacent to the focus display location;
- receiving a first scroll instruction to scroll the collection, causing a first one of the items to depart a corresponding standard display location in the first arrangement adjacent to the focus display location and to occupy the focus display location as the focus item;
- receiving an immediately following scroll instruction to scroll the collection, causing that first item to depart the focus display location and to occupy, in the second arrangement adjacent to the focus display location, a standard display location corresponding to the first standard display location occupied by the first item in the first arrangement, such that as a consequence of the scroll instructions, each item progressively occupies the same relative position in the second arrangement as that occupied by the item in the first arrangement, having departed the focus display location; and
- causing a second item, immediately following the first item in the collection, and in response to the immediately following scroll instruction, to depart its standard display location in the first arrangement and to occupy the focus location as the focus item, such that the standard display location of the second item in the first arrangement becomes empty, while any items present at others of the standard display locations in the first arrangement remain where they are.

7. A method according to claim 6, further comprising presenting the focus item within the focus location in a different spatial relationship to those items presented within the standard display locations of the first and second arrangements.

8. A method according to claim 6, further comprising displaying the 2-dimensional repeating arrangements as parallel arranged stacks of display locations within which representations of the items are displayable.

9. A method according to claim 6, further comprising displaying the 2-dimensional repeating arrangements as repeating non-uniform configurations of the standard display locations within which representations of the items are displayable.

10. A non-transitory computer-readable storage medium having a program recorded thereon, the program being executable by a computer apparatus to scroll items of a collection in a graphical user interface reproducible upon a display, each item having a corresponding individual position in the collection, the program comprising:
- code for displaying a focus item in a focus display location, the focus item being one of the collection;
- code for displaying first and second 2-dimensional repeating arrangements of the items spatially separated by the focus display location, the first arrangement preceding the focus display location in a direction of scroll and the second arrangement following the focus display location the direction of scroll, each arrangement including a plurality of standard display locations at which a plural number of items of the collection are displayable adjacent to the focus display location;
- code for receiving a first scroll instruction to scroll the collection, causing a first one of the items to depart a corresponding standard display location in the first arrangement adjacent to the focus display location and to occupy the focus display location as the focus item;
- code for receiving an immediately following scroll instruction to scroll the collection, causing that first item to depart the focus display location and to occupy, in the second arrangement adjacent to the focus display location, a standard display location corresponding to the first standard display location occupied by the first item in the first arrangement, such that as a consequence of the scroll instructions, each item progressively occupies the same relative position in the second arrangement as that occupied by the item in the first arrangement, having departed the focus display location, and code for causing a second item, immediately following the first item in the collection, and in response to the immediately following scroll instruction, to depart its standard display location in the first arrangement and to occupy the focus location as the focus item, such that the standard display location of the second item in the first arrangement becomes empty, while any items present at others of the standard display locations in the first arrangement remain where they are.

11. A computer readable storage medium according to claim 10, wherein the program further comprises code for presenting the focus item within the focus location in a different spatial relationship to those items presented within the standard display locations of the first and second arrangements.

12. A computer readable storage medium according to claim 10, wherein the program further comprises code for displaying the 2-dimensional repeating arrangements as parallel arranged stacks of display locations within which representations of the items are displayable.

13. A computer readable storage medium according to claim 10, wherein the program further comprises code for displaying the 2-dimensional repeating arrangements as repeating non-uniform configurations of the standard display locations within which representations of the items are displayable.

14. A computer apparatus for browsing an ordered collection of items, said apparatus comprising:

a processor;

a display device coupled to said processor;

a scroll input coupled to said processor from which said processor forms a scroll instruction;

a storage medium coupled to said processor and having a program recorded therein, the program being executable by said processor to browse by scrolling items of the collection in a graphical user interface reproducible upon said display device, each item having a corresponding individual position in the collection, said program comprising:

code for displaying a focus item in a focus display location of the graphical user interface, the focus item being one of the collection;

code for displaying in the graphical user interface first and second 2-dimensional repeating arrangements of the items spatially separated by the focus display location, the first arrangement preceding the focus display location in a direction of scroll and the second arrangement following the focus display location the direction of scroll, each arrangement including a plurality of standard display locations at which a plural number of items of the collection are displayable adjacent to the focus display location;

code, operative on receipt of a first scroll instruction to scroll the collection, to cause a first one of the items to depart a corresponding standard display location in the first arrangement adjacent to the focus display location and to occupy the focus display location as the focus item;

code, operative on receipt of an immediately following scroll instruction to scroll the collection, to cause that first item to depart the focus display location and to occupy, in the second arrangement adjacent to the focus display location, a standard display location corresponding to the first standard display location occupied by the first item in the first arrangement, such that as a consequence of the scroll instructions, each item progressively occupies the same relative position in the second arrangement as that occupied by the item in the first arrangement, having departed the focus display location, and code for causing a second item, immediately following the first item in the collection, and in response to the immediately following scroll instruction, to depart its standard display location in the first arrangement and to occupy the focus location as the focus item, such that the standard display location of the second item in the first arrangement becomes empty, while any items present at others of the standard display locations in the first arrangement remain where they are.

\* \* \* \* \*